US005217036A

United States Patent [19]

Maier

[11] Patent Number: 5,217,036

[45] Date of Patent: Jun. 8, 1993

[54] METHOD FOR ADJUSTING A VALVE, AND VALVE

[75] Inventor: Stefan Maier, Schwieberdingen, Fed. Rep. of Germany

[73] Assignee: Robert Bosch GmbH, Stuttgart, Fed. Rep. of Germany

[21] Appl. No.: 838,275

[22] PCT Filed: Jul. 17, 1991

[86] PCT No.: PCT/DE91/00586

§ 371 Date: Mar. 13, 1992

§ 102(e) Date: Mar. 13, 1992

[87] PCT Pub. No.: WO92/03650

PCT Pub. Date: Mar. 5, 1992

[30] Foreign Application Priority Data

Aug. 22, 1990 [DE] Fed. Rep. of Germany ....... 4026531

[51] Int. Cl.[5] .......... F16K 31/06

[52] U.S. Cl. .......... 137/1; 251/129.18; 251/129.15

[58] Field of Search .......... 251/129.18; 137/82, 137/129.15, 1

[56] References Cited

U.S. PATENT DOCUMENTS 4,947,887 8/1990 Fox .......... 137/82
4,967,781 11/1990 Baron .......... 137/82
5,065,979 11/1991 Detweiler et al. .......... 137/82 X

*Primary Examiner*—Arnold Rosenthal
*Attorney, Agent, or Firm*—Edwin E. Greigg; Ronald E. Greigg

[57] ABSTRACT

An electromagnetically actuatable valve in which the fluid flow quantity output during the opening and closing process of the valve is adjusted by varying the magnitude of the spring force of the restoring spring acting upon the valve closing body by varying the magnetic attraction on the valve closing element. For adjusting the fluid flow quantity output during the opening and closing process of the electromagnetically adjustable valve, the housing cap (10) is moved relative to the valve jacket and thus the critical magnetic throttle cross section defining the magnetic flux of the magnetic circuit is varied, until the measured output actual quantity of the fluid matches a predetermined set-point quantity. The method and valve according to the invention is especially well-suited for electromagnetically actuatable fuel injection valves of fuel injection systems of internal combustion engines.

9 Claims, 4 Drawing Sheets

METHOD FOR ADJUSTING A VALVE, AND VALVE

BACKGROUND OF THE INVENTION

The invention is based on a method for adjusting the dynamic fluid flow quantity output during the opening and closing process of an electromagnetically actuatable valve, and an electromagnetically actuatable valve, as define hereinafter. In known valves, the dynamic fluid flow quantity output during the opening and closing process is adjusted by varying the magnitude of the spring force of a restoring spring acting upon the valve closing body. The valve known from German Offenlegungsschrift 37 27 342 (U.S. Pat. No. 4,832,314 ) has an adjusting bolt displaceably disposed in a longitudinal bore of the inner pole; one end of the restoring spring rests on one face end of this bolt. The depth to which the adjusting bolt is pressed into the longitudinal bore of the inner pole determines the magnitude of the spring force. German Offenlegungsschrift 29 42 853 discloses a valve in which the spring force of the restoring spring is adjusted by the depth to which an adjusting screw that can be screwed into the longitudinal bore of the inner pole is installed. One end of the restoring spring rests on one face end of the adjusting screw.

However, adjusting the dynamic fluid flow quantity output during the opening and closing process by adjusting the spring force of the restoring spring acting upon the valve closing body has the disadvantage that in the finally installed valve some capability of access to the restoring spring, in the form of an easily accessible adjusting element, must be provided, and then must additionally be sealed off.

Moreover, the range of variation of the spring force of the restoring spring is limited on the one hand by the force of attraction of the magnetic circuit and on the other by the effect on the tightness of the valve seat.

ADVANTAGES OF THE INVENTION

The method according to the invention and the electromagnetically actuatable valve have the advantage of a particularly simple, automatable adjustment of the dynamic fluid flow quantity of an electromagnetically actuatable valve output during its opening and closing process, which requires no capability for access to the restoring spring. That is, the finally installed valve no longer requires any capability for access to the restoring spring. Instead, the restoring spring has a constant, preset spring force.

The adjustment of the dynamic fluid flow quantity is done by varying a magnetic throttling action. The cross sections of the magnetic circuit, that is, the cross sections of the inner pole, an armature cooperating with the inner pole, the valve jacket and the housing cap, are designed such that the critical magnetic throttle cross section defining the magnetic force in the excited state, preferably embodied as a saturation cross section, is located in the region between the valve jacket and the housing cap. If the housing cap and the valve jacket are moved relative to one another, the magnetic throttling and the magnetic flux of the magnetic circuit then vary, and thus the magnetic force determining the dynamic fluid flow quantity varies as well.

The adjusting process can be fully automated and is thus well-suited for large-scale mass production.

Advantageous further features of and improvements to the and the valve are possible with the provisions recited hereinafter.

For simple, accurate and automatable adjustment of the dynamic fluid flow quantity output during the opening and closing process, it is especially advantageous if the housing cap protrudes axially from the valve jacket, and the housing cap and valve jacket are displaced axially relative to one another to vary the overlap between the housing cap and valve jacket that influences the magnetic throttling.

For the same reason it is also advantageous if at least one partially encompassing recess is formed out of the housing cap and if another such recess is formed out of the valve jacket, and the housing cap and valve jacket are rotated relative to one another in order to vary the overlap of the housing cap and valve jacket that influences the magnetic throttling.

It is advantageous if the at least one partially encompassing recess is formed in the circumference of the housing cap and the at least one partially encompassing recess is formed in the region of the wall of the valve jacket that cooperates with the housing cap.

It is also advantageous if the at least one partially encompassing recess is formed in a face end of the housing cap toward the valve jacket, and the at least one partially encompassing recess is formed in a face end of the valve jacket toward the housing cap.

BRIEF DESCRIPTION OF THE DRAWING

Exemplary embodiments of the invention are shown in simplified form in the drawing and described in further detail in the ensuing description.

DESCRIPTION OF THE EXEMPLARY EMBODIMENTS

Figure 1:
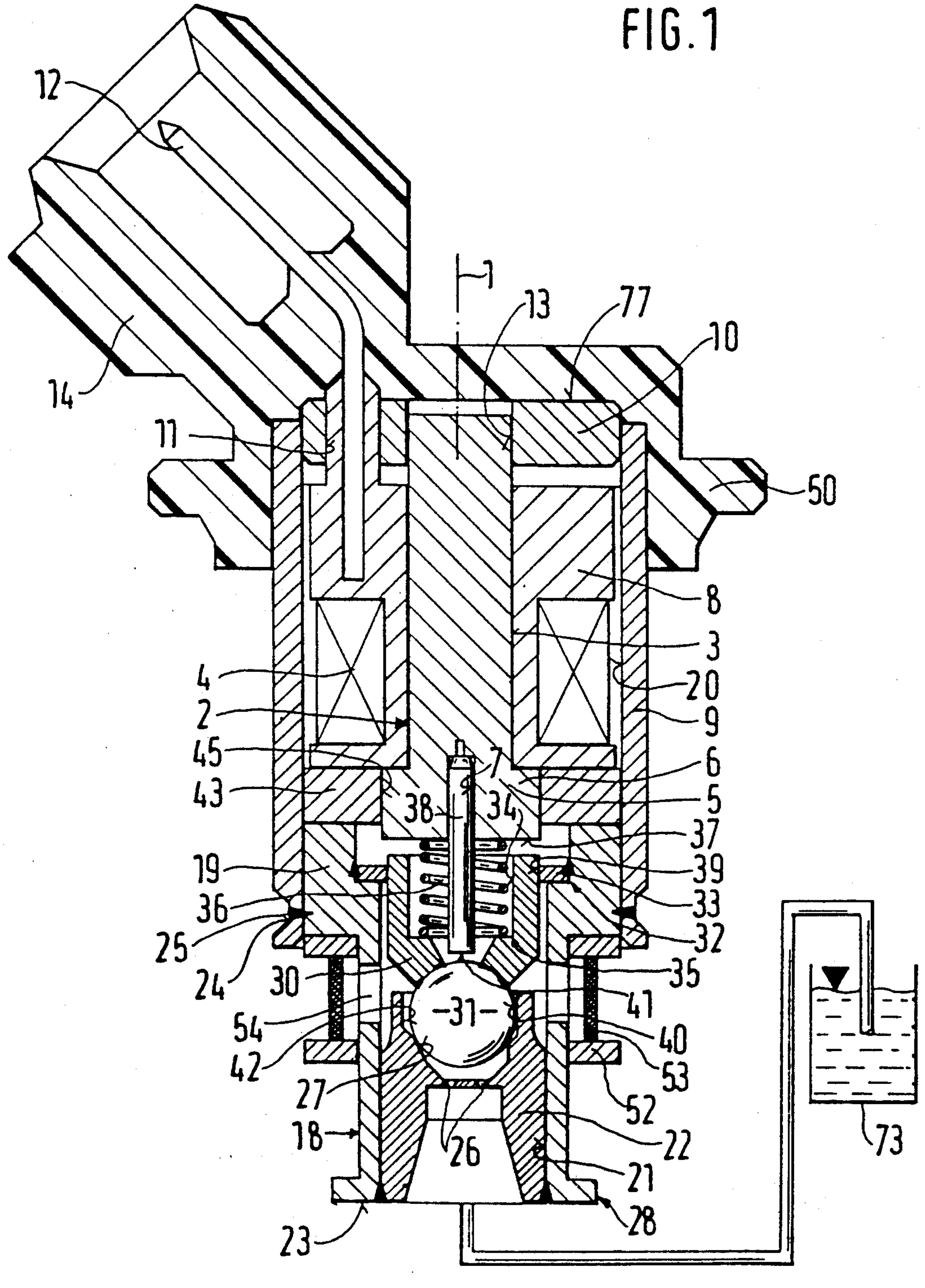
FIG. 1 shows a first exemplary embodiment of an electromagnetically actuatable valve that enables carrying out the method according to the invention.

The electromagnetically actuatable valves, shown in FIGS. 1–5 by way of example in the form of fuel injection valves for fuel injection systems, for example of mixture-compressing internal combustion engines with externally supplied ignition, enable the carrying out of the method of the invention for adjustment of the dynamic fluid flow quantity output during the opening and closing process. The three exemplary embodiments differ only slightly from one another, so that elements that are the same and function the same are identified by the same reference numerals.

Concentric with a longitudinal valve axis 1, the valves have an inner pole 2 of a ferromagnetic material, which for instance is stepped in shape, and which in a coil segment 3 is partly surrounded by a magnet coil 4. On a lower pole end 5 of the inner pole 2, a flange 6 is formed, which has a blind bore opening 7 concentric with the longitudinal valve axis 1.

The magnet coil 4 with its coil holder part 8 is surrounded by a valve jacket 9, which extends axially past the flange 6 of the inner pole 2. A circular-annular housing cap 10 is disposed on the end of the inner pole 2 remote from the flange 6, above the magnet coil 4, in the radial direction between the inner pole 2 and the valve jacket 9. The housing cap 10 is movable relative to the valve jacket 9 and is for instance guided axially on a guide opening 13 formed concentrically with the longitudinal valve axis 1, in that the housing cap 10, with its guide opening 13, fits around the circumference of the inner pole 2 with slight radial play. However, it is also possible for the housing cap 10 to be surrounded on its circumference in the radial direction by the valve jacket 9 with little play and thereby guided in the axial direction. The housing cap 10 is made of a ferromagnetic material and has ducts 11 through which contact lugs 12 extend that begin at an electrical connection plug 1 and provide electrical contact for the magnet coil 4.

A nozzle holder 18 protrudes by an upper flange segment 19 into an end, remote from the housing cap 10, of a through opening 20 of the valve jacket 9 formed concentrically with the longitudinal valve axis 1. The flange segment 19 is firmly joined to the valve jacket 9, for instance by means of a weld seam 25 extending within a cross-sectional reduction 24 of the valve jacket 9. In a receiving opening 21 formed concentrically with the longitudinal valve axis 1, the nozzle holder 18 has a nozzle body 22, remote from the magnet coil 4. The nozzle body 22 is joined to the nozzle holder 18, for instance by welding, on the face end 23 of the nozzle holder remote from the magnet coil 4. Downstream of its fixed valve seat 27, the nozzle holder 22 has injection ports 26, which for instance are two in number.

Protruding into the receiving opening 21 of the nozzle holder 18 is a tubular armature 30 cooperating with the lower pole end 5 of the inner pole 2. On its end toward the valve seat 27, the armature 30 is joined directly, for instance by welding or soldering, to a spherical valve closing body 31 that cooperates with the valve seat 27. The compact and very lightweight moving valve part, comprising the tubular armature 30 and the valve closing body 31 embodied as a ball, enables not only good dynamic behavior and good performance in continuous operation, but also makes a particularly short, compact structural form of the valve possible.

For guidance of the moving valve part comprising the armature 30 and the valve closing body 31, a guide ring 33 is disposed on the end of the nozzle holder 18 remote from the nozzle body 22, resting on a retaining shoulder 32 of the receiving opening 21; this ring is made of a nonmagnetic, for instance ceramic material and is firmly joined to the retaining shoulder 32 of the nozzle holder 18. The guide ring 33 is narrow in the axial direction and has a guide opening 39, concentric with the longitudinal valve axis 1, that protrudes through the armature 30 with little play in order to guide it.

The tubular armature 30, in its stepped through bore 34, has a spring shoulder 35 on its end remote from the inner pole 2; one end of a restoring spring 36 is supported on this shoulder. By its other end, the restoring spring 36 rests on one face end 37 of the flange 6 of the inner pole 2. The restoring spring 36 acts upon the armature 30 and the valve closing body 31 with a constant, preset spring force. A stop pin 38 that protrudes into the through bore 34 of the armature 30 is disposed in the blind bore opening 7 of the flange 6. In the opening position of the valve, the valve closing body 31 rests on one face end 41 of the stop pin 38, thereby defining the opening stroke of the valve closing body 31 in a simple manner.

The spherical valve closing body 31 is slideably supported in a slide bore 40 formed in the nozzle holder 22 upstream of the valve seat 27. The wall of the slide bore 40 is pierced by flow conduits 42, which enable the flow of a fluid from the receiving opening 21 of the nozzle holder 18 to the valve seat 27.

On the end of the magnet coil 4 toward the nozzle holder 18, an intermediate ring 43 is disposed in the radial direction between the flange 6 of the inner pole 2 and the valve jacket 9; it is embodied of a nonmagnetic material having a specific electrical resistance, for example a ceramic material. It is possible for the intermediate ring 43 to be tightly joined to the circumference of the flange 6, for instance by being soldered on its circumference to the through opening 20 of the valve jacket 9 or on its inner opening 45 to the circumference of the flange 6, thereby reducing the danger that the magnet coil 4 might come into contact with the fluid.

A carrier ring 52, which for assembly purposes, because of a radially outwardly pointing retaining shoulder 28 formed on the circumference of the nozzle holder 18, on its end toward the face end 23, is embodied as split axially in two is disposed on the circumference of the nozzle holder 28, in the direction toward the injection ports 26 of the nozzle body 22, directly adjoining the flange segment 19. The carrier ring 52 encloses a filter element 53, via which the fluid can flow from a fluid source, for example a fuel pump, to transverse openings 54, which pierce the wall of the nozzle holder 18 in such a way that a flow of fluid into the interior, enclosed by the receiving opening 21, to the valve seat 27 is made possible.

In the first exemplary embodiment of a valve according to the invention, shown in FIG. 1, the housing cap 10 and the valve jacket 9 are displaceable relative to one another in the axial direction. The cross sections of the magnetic circuit, that is, the cross sections of the inner pole 2, armature 30, valve jacket 9 and housing cap 10, are designed such that the critical throttle cross section of the magnetic circuit, defining the magnetic force in the excited state, is located in the region of the overlap between the circumference of the housing cap 10 and the through opening 20 of the valve jacket 9. Thus as a rule the housing cap 10 protrudes out of the through opening 20 of the valve jacket 9, and can be displaced into the valve jacket 9 to increase the overlap and thus to increase the magnetic throttle cross section, or pulled farther out of the valve jacket 9 to reduce the overlap and thus to reduce the magnetic throttle cross section.

Adjustment of the dynamic fluid flow quantity output during the opening and closing process is done by varying the magnetic throttle that defines the magnetic flux and thus the magnetic force of the magnetic circuit. In a first method step, the actual fluid quantity output from the finally installed valve is measured by means of a collection container 73 and compared with the desired predetermined set-point fluid quantity. If the actual quantity output and the predetermined set-point quantity do not match, then in a second method step, the housing cap 10, protruding into the through opening 20 of the valve jacket 9, and the valve jacket 9 are displaced axially, relative to one another, for instance by means of a pressing tool, not shown, whereupon the housing cap 10 moves slidingly in the through opening 20 relative to that opening, so that the overlap with the valve jacket 9 changes. If the area of overlap of the circumference of the housing gap 10 with the through opening 20 of the valve jacket 9 is varied as a result of the axial displacement of the housing cap 10 and the valve jacket 9 relative to one another, then the magnetic throttle cross section and the magnetic throttling, which define the magnetic flux and thus the magnetic force of the magnetic circuit, vary as well. The magnitude of the magnetic force has a decisive influence on the opening and closing speed of the valve and thus upon the dynamic fluid flow quantity output during the opening and closing process.

For instance, if the magnetic force is increased by an enlargement of the critical magnetic throttle cross section defining the magnetic flux of the magnetic circuit, then the attraction time of the armature 30 decreases, while the drop time of the armature 30 increases, so that the dynamic fluid flow quantity of valve changes. The housing cap 10 and the valve jacket 9 are displaced axially relative to one another, thereby varying the critical throttle cross section of the magnetic circuit, until such time as the measured actual quantity matches the required set-point quantity.

Finally, the housing cap 10 is then fixed to the valve jacket 9, for example by the making a laser spot weld.

Figure 2:
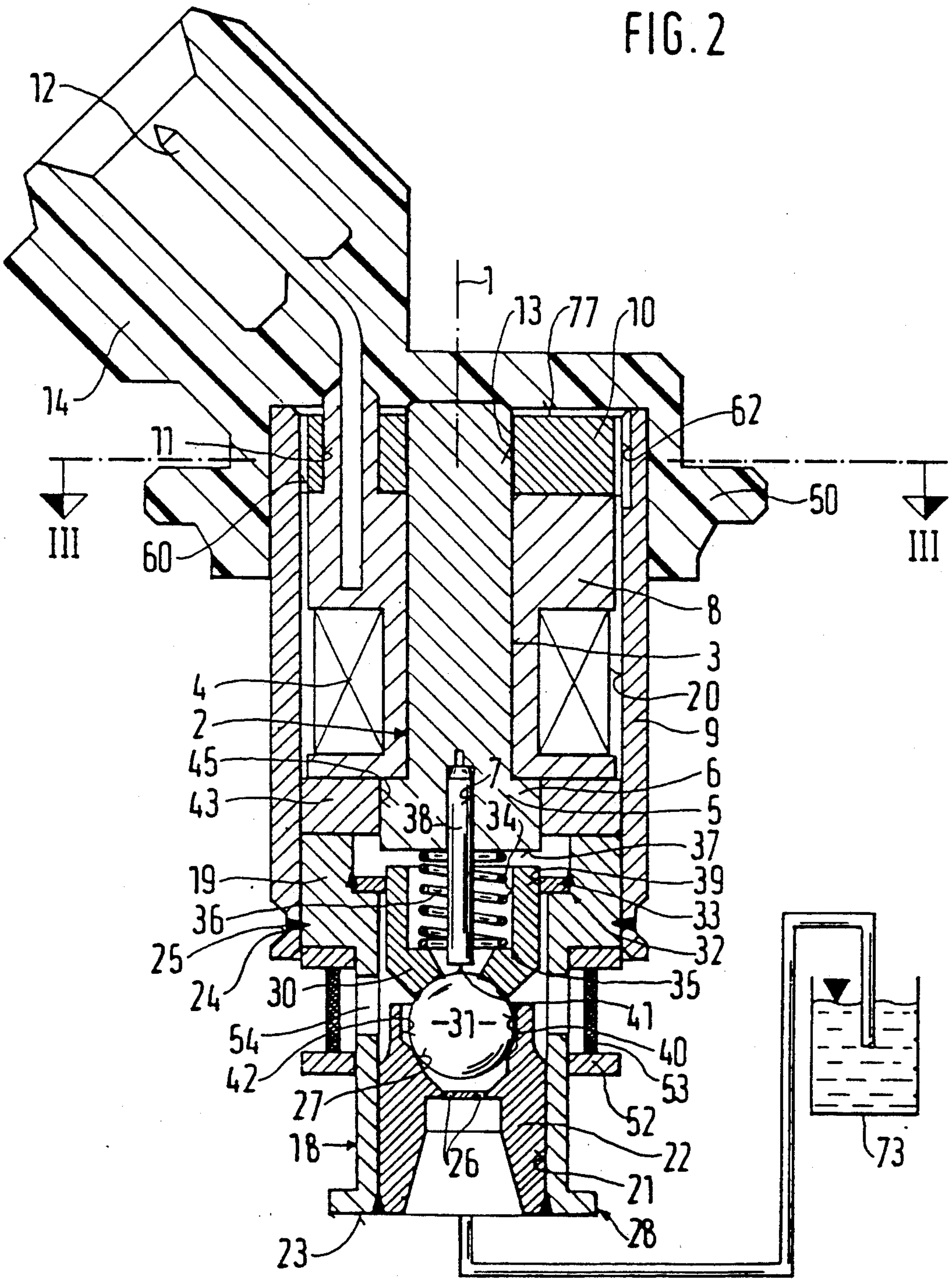
FIG. 2 shows a second exemplary embodiment.
Figure 3:
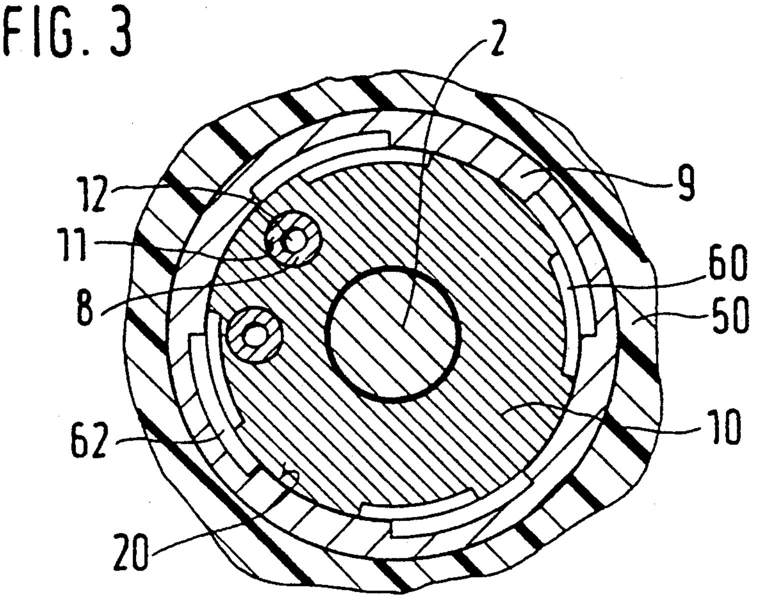
FIG. 3 is a second taken along the line III—III of FIG. 2.

FIGS. 2 and 3 show a valve in accordance with a second exemplary embodiment of the invention, in which the housing cap 10 and the valve jacket 9 are rotatable relative to one another. FIG. 3 is a section taken along the line III—III of FIG. 2.

At least one and for instance four partially encompassing recesses 60 are formed on the circumference of the housing cap 10 in the second exemplary embodiment the recesses 60 extend axially, for instance all the way over the circumference of the housing cap 10. On the end remote from the valve closing body 31, the through opening 20 of the valve jacket 9, in the region cooperating with the housing cap 10, has at least one and in the second exemplary embodiment 4 partially encompassing recesses 62, which are spaced apart from one another by approximately the same distance as are the recesses 60 of the housing cap 10. As in the first exemplary embodiment shown in FIG. 1, in the second exemplary embodiment the cross sections of the magnetic circuit, that is, the cross sections of the inner pole 2, armature 30, valve jacket 9 and housing cap 10, are designed such that the critical magnetic throttle cross section defining the magnetic flux and thus the magnetic force is located in the region of the overlap between the circumference of the housing cap 10 and the through opening 20 of the valve jacket 9.

For adjustment of the dynamic fluid flow quantity output during the opening and closing process, in a first method step according to the invention, the output actual fluid quantity of the finally installed valve is measured by means of the collection container 73 and compared with the desired, predetermined set-point fluid quantity. If the measured actual quantity does not match the predetermined set-point quantity, then in a second method step, the housing cap 10, disposed in the end of the through opening 20 of the valve jacket 9 remote from the valve closing body 31, and the valve jacket 9 are rotated relative to one another until the output actual quantity matches the predetermined set-point quantity. By means of the rotation of the housing cap 10 and valve jacket 9 relative to one another, the overlaps of the partially encompassing recesses 62 of the through opening 20 of the valve jacket 9 by the partially encompassing recesses 60 of the housing cap 10, and thus the magnetic throttle cross section or the magnetic throttling, which define the magnetic flux and thus the magnetic force, are varied. Because of the dependency of the dynamic fluid flow quantity of the valve on the magnitude of the magnetic force, the dynamic fluid flow quantity can be adjusted in a simple manner. Finally, the housing cap 10 is fixed relative to the valve jacket 9, for instance by means of a laser spot weld.

Naturally, an axial displacement of the housing cap 10 and valve jacket 9, already described in conjunction with the first exemplary embodiment of FIG. 1, can be superimposed upon the just-described adjustment of the magnetic throttle cross section by rotating the housing cap 10 and the valve jacket 9 relative to one another.

Figure 4:
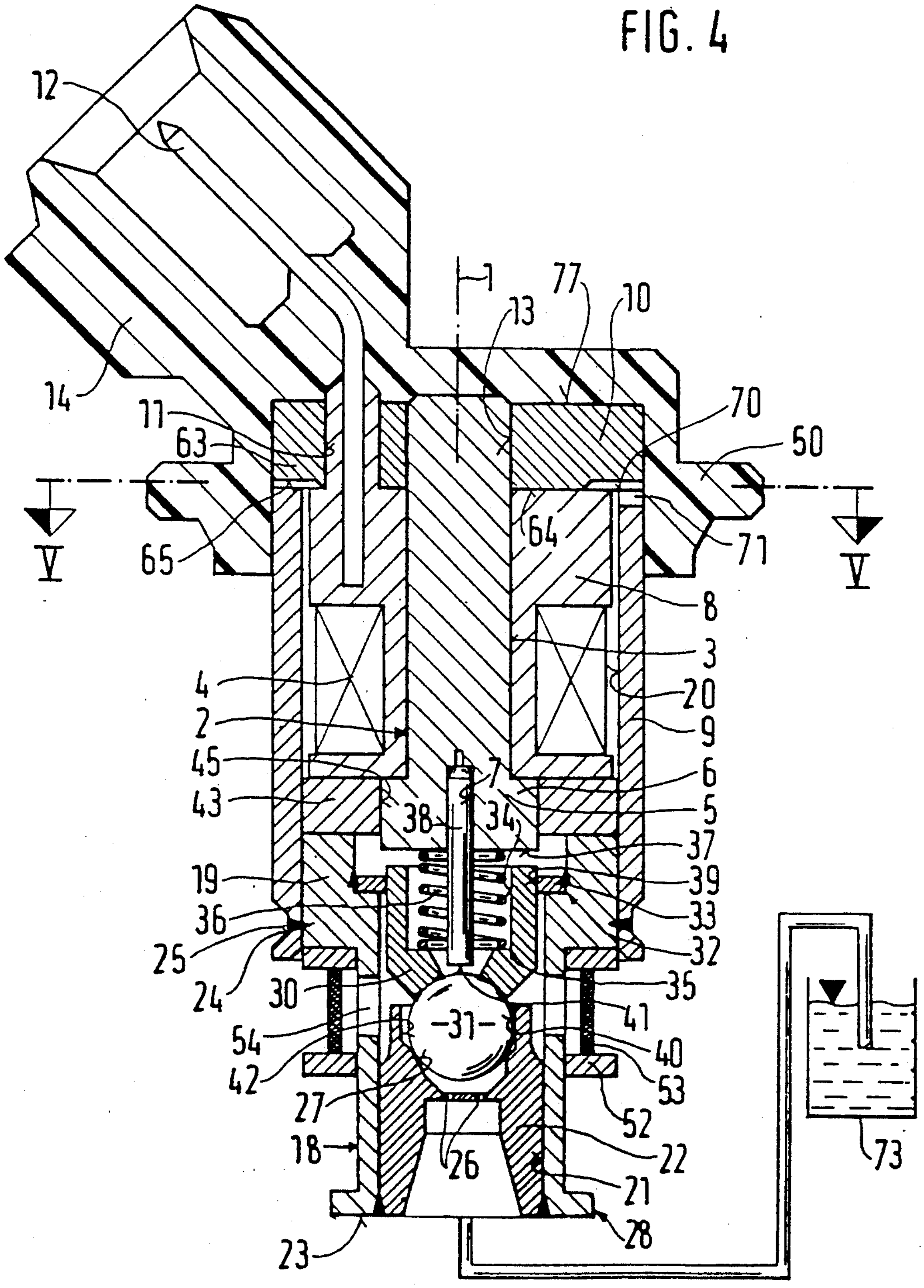
FIG. 4 shows a third exemplary embodiment.
Figure 5:
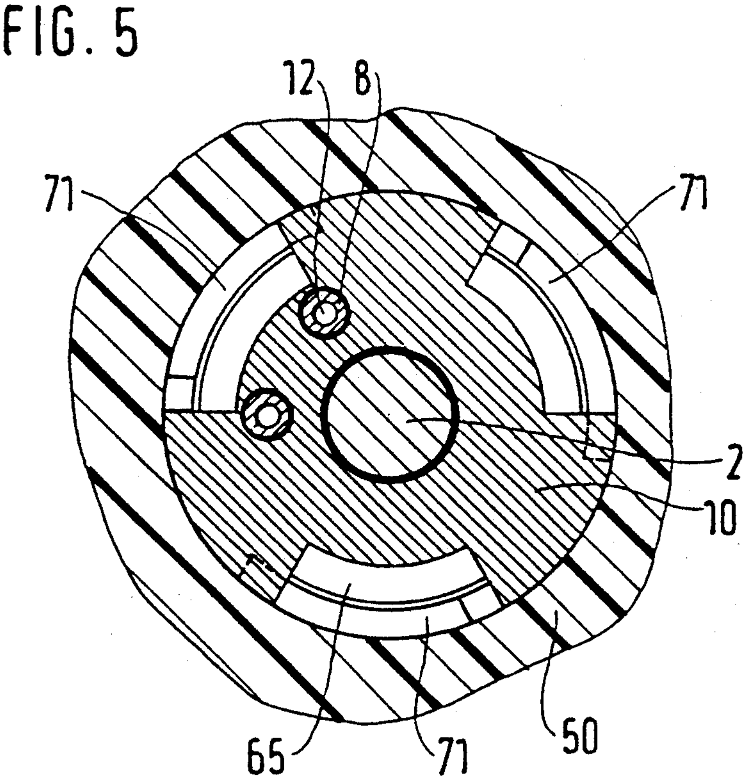
FIG. 5 shows a section taken along the line V—V of FIG. 4.

In the valve of a third exemplary embodiment, shown in FIGS. 4 and 5, the housing cap 10 and valve jacket 9 are rotatable relative to one another. FIG. 5 shows a section taken along the line V—V of FIG. 4.

At least one and for instance three partially encompassing recesses 65 are formed on the face end 64 of the housing cap 10 toward the valve closing body 31. The recesses 65 extend radially outward as far as the circumference of the housing cap 10.

The housing cap 10 rests with its face end 64 on a face end 70 of the valve jacket 9. At least one and in the third exemplary embodiment shown for instance three partially encompassing recesses 71 are formed in the face end 70 of the valve jacket 9; as shown by way of example, they extend radially past the entire face end 70 and are spaced apart from one another by approximately the same distance as are the recesses 65 of the housing cap 10.

The cross sections of the magnetic circuit, that is, of the inner pole 2, armature 30, valve jacket 9 and housing cap 10, are designed in such a way in this third exemplary embodiment of the invention that the critical throttle cross section of the magnetic circuit, defining the magnetic flux, is located in the region of the overlap between the housing cap 10 and the face end 70 of the valve jacket 9.

For adjustment of the dynamic fluid flow quantity output during the opening and closing process, in a first method step according to the invention, the output actual fluid quantity of the finally installed valve is measured by means of the collection container 73 and compared with the desired, predetermined set-point fluid quantity. If the measured actual quantity and the predetermined set-point quantity do not match, then in a second method step according to the invention, the housing cap and the valve jacket 9 are rotated relative to one another, until the actual output quantity matches the predetermined set-point quantity. By rotating the housing cap 10 and valve jacket 9 relative to one another, the overlaps of the partially encompassing recesses 71 of the face end 70 of the valve jacket 9 by the partially encompassing recesses 65 of the face end 64 of the housing cap 10 are varied. The size of the critical cross section of the magnetic circuit and of the magnetic throttling in the region between the housing cap 10 and the valve 9, which determined the magnetic flux and thus the magnetic force of the magnetic circuit, is thus varied as well. Because of the dependency of the dynamic fluid flow quantity of the valve on the magnitude of the magnetic force, the dynamic fluid flow quantity can be adjusted in a simple manner in this third exemplary embodiment as well. Finally, the housing cap 10 is fixed relative to the valve jacket 9.

In the second and third exemplary embodiments of the invention, however, it is also possible, depending on the position of the valve jacket 9 and of the housing cap 10 relative to one another, that the recesses 62 or 71 of the valve jacket 9 may not be overlapped by the recesses 60 or 65 of the housing cap 10.

The finally installed valve, the dynamic fluid flow quantity of which, output during the opening and closing process, has been correctly adjusted is finally enclosed by a plastic sheath 50, which can be attained by potting it in or coating it with plastic. The plastic sheath 50 encompasses at least part of the valve jacket 9 and the face end 77 of the housing cap 10 remote from the valve closing body 30. The electrical connection plug 14, by which the electric connection and thus the excitation of the magnet coil 4 are effected, is formed jointly onto the plastic sheath 50 at the same time.

The adjusting method according to the invention offers the advantage that no accessibility to the restoring spring 36 is needed in the finally installed valve; instead, the adjustment can be performed from outside. In addition, the adjusting process can be fully automated and thus is well suited for large-scale mass production.

I claim:

1. A method for adjusting a dynamic fluid flow quantity output due to opening and closing off an electromagnetically actuatable valve, including a magnet coil (4), an inner pole 2, an armature including a valve closing body secured thereto, a valve jacket and a housing cap positioned relative to an end of the valve jacket remote from said valve closing body, comprising mounting said housing cap relative to said valve jacket so that the housing cap protrudes axially out of the valve jacket (9) and, applying a current to said magnet coil for excitation of said armature to open said valve closing body, directing a quantity of fluid through said valve for a set period, measuring the actual fluid quantity output of a finally installed valve (73), comparing the measured quantity with a predetermined set-point fluid quantity, adjusting the housing cap (10) relative to the valve jacket (9) of the valve to change the magnetic field excitation of the armature to adjust the valve opening until the actual measured actual fluid quantity matches a predetermined set-point fluid quantity, and finally the valve jacket (9) and housing cap (10) ar displaced relative to one another in an axial direction to vary an overlap between the housing cap (10) and valve jacket (9) of the valve that influences the magnetic attraction on the armature to control the opening of the valve closing body.

2. A method for adjusting a dynamic fluid flow quantity output due to opening and closing off an electromagnetically actuatable valve, including a magnet coil (4), an inner pole 2, an armature including a valve closing body secured thereto, a valve jacket and a housing cap positioned relative to an end of the valve jacket remote from said valve closing body, comprising mounting said housing cap relative to said valve jacket, forming at least one partially encompassing recess (60, 65) out of the housing cap (10) and at least one partially encompassing recess (62, 71) out of the valve jacket (9), applying a current to said magnet coil for excitation of said armature to open said valve closing body, directing a quantity of fluid through said valve for a set period, measuring the actual fluid quantity output of a finally installed valve (73), comparing the measured quantity with a predetermined set-point fluid quantity, rotating the housing cap (10) relative to the valve jacket (9) of the valve to influence the magnetic attraction of the armature to control the valve opening of the valve closing body until the actual measured actual fluid quantity matches a predetermined set-point fluid quantity, and finally the valve jacket (9) and housing cap (10) are fixed relative to one another.

3. A method as defined by claim 2, which comprises forming at least one partially encompassing recess (60) out of a circumference of the housing cap (10) and the at least one partially encompassing recess (62) is formed out of a region of a wall of the valve jacket (9) cooperating with the housing cap (10), and that the housing cap (10) and valve jacket (9) are rotated relative to one another to vary the overlap between the housing cap (10) and valve jacket (9) to influence the magnetic attraction on the armature to control the opening of the valve closing body.

4. A method as defined by claim 2, which comprises forming at least one partially encompassing recess (65) out of a face end (64) of the housing cap (10) toward the valve jacket (9), and the at least one partially encompassing recess (71) is formed out of a face end (70) of the valve jacket toward the housing cap (10), and that the housing cap (10) and valve jacket (9) are rotated relative to one another to vary the overlap between the housing cap (10) and valve jacket (9) that influences the magnetic attraction on the armature to control the opening of the valve closing body.

5. An electromagnetically actuatable valve, in particular a fuel injection valve, including a magnet coil (4), an inner pole (2), an armature including a valve closing body secured thereto which seats on a valve seat, having a valve jacket and a housing cap which encloses said valve, said housing cap protrudes axially out of the valve jacket (9), and is positioned relative to an end of the valve jacket remote from the valve closing body, upon excitation of the magnet coil (4), a magnetic throttling takes place between the valve jacket (9) and the housing cap (10); to control an opening of said valve closing body, the housing cap (10) is displaceable relative to the valve jacket (9) in an axial direction relative to said valve jacket (9) in order to vary an overlap of the housing cap (10) and valve jacket (9) that influences the magnetic throttling between the valve jacket (9) and the housing cap (10); and that the valve jacket (9) and housing cap (10) are fixed relative to one another subsequent to determining a set point quantity of fluid flow through the valve.

6. A valve as defined by claim 5, in which the valve jacket (9) and housing cap (10) are embodied such that in a region of the overlap between the valve jacket (9) and the housing cap (10), the magnetic throttling there upon excitation of the magnet coil (4) leads to a magnetic saturation.

7. An electromagnetically actuatable valve, in particular a fuel injection valve, including a magnet coil (4), an inner pole (2), an armature including a valve closing body secured thereto which seats on a valve seat, having a valve jacket and a housing cap which encloses said valve, said housing cap is positioned relative to an end of the valve jacket remote from the valve closing body, at least one partially encompassing recess (60, 65) is formed out of the housing cap (10) and at least one partially encompassing recess (62, 71) is formed out of the valve jacket (9), upon excitation of the magnet coil (4), a magnetic throttling takes place between the valve jacket (9) and the housing cap (10); to control an opening of said valve closing body the housing cap (10) and the valve jacket (9) are rotatable relative to one another to vary an overlap between the housing cap (10) and valve jacket (9) that influences the magnetic throttling between the valve jacket (9) and the housing cap (10); and that the valve jacket (9) and housing cap (10) are fixed relative to one another subsequent to determining a set point quantity of fluid flow through the valve.

8. A valve as defined by claim 7, in which the at least one partially encompassing recess (60) is formed out of the circumference of the housing cap (10) and the at least one partially encompassing recess (62) is formed out of a region of a wall of the valve jacket (9) cooperating with the housing cap (10), and that the housing cap (10) are rotatable relative to said valve jacket to vary the overlap between the housing cap (10) and valve jacket (9) that influences the magnetic throttling.

9. A valve as defined by claim 7, in which the at least one partially encompassing recess (65) is formed out of a face end (64) of the housing cap (10) toward the valve jacket (9), and the at least one partially encompassing recess (71) is formed out of a face end (70) of the valve jacket toward the housing cap (10), and that the housing cap (10) is rotatable relative to said valve jacket to vary the overlap between the housing cap (10) and valve jacket (9) that influences the magnetic throttling.

* * * * *